(No Model.)

C. C. STEPHENSON.
ICE ROAD MACHINE.

No. 348,502. Patented Aug. 31, 1886.

Witnesses:
Otto Fr. Nyberg
N. C. Corlies

Inventor:
Casper C. Stephenson
By Coburn & Thacher
Attorneys.

UNITED STATES PATENT OFFICE.

CASPER C. STEPHENSON, OF ESCANABA, MICHIGAN.

ICE-ROAD MACHINE.

SPECIFICATION forming part of Letters Patent No. 348,502, dated August 31, 1886.

Application filed May 29, 1885. Serial No. 167,084. (No model.)

*To all whom it may concern:*

Be it known that I, CASPER C. STEPHENSON, a citizen of the United States, and residing at Escanaba, in the county of Delta and State of Michigan, have invented certain new and useful Improvements in Ice - Road Machines, which are fully set forth in the following specification, reference being had to the accompanying drawings, in which—

Figure 1:
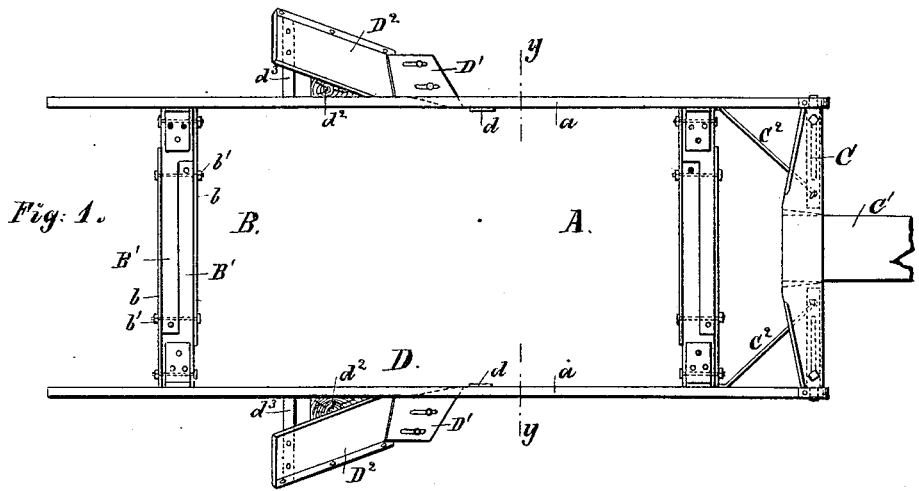
Figure 2:
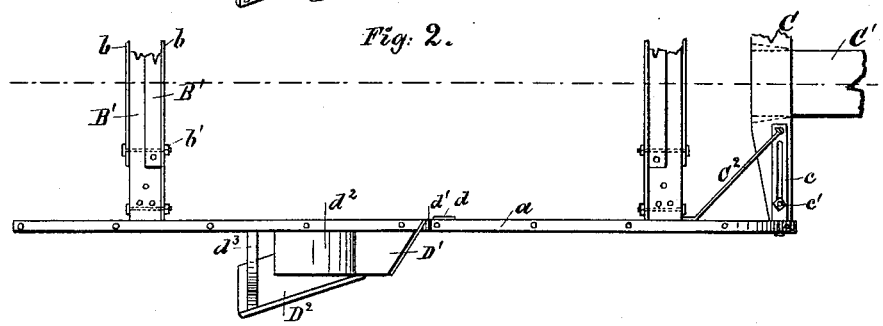
Figure 3:
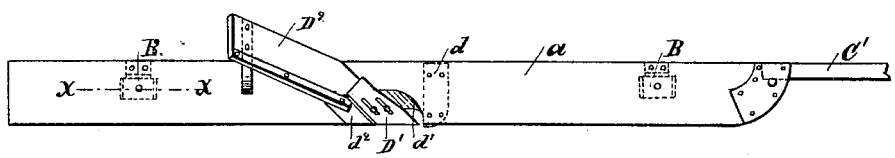
Figure 4:
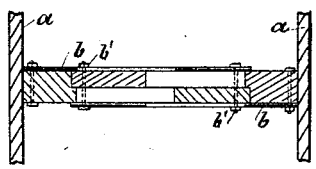
Figure 5:
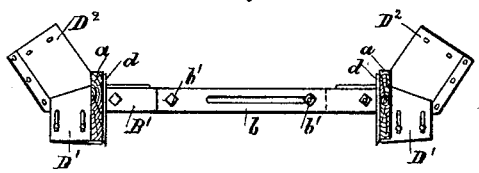

Figure 1 is a top plan view of a device embodying my invention; Fig. 2, a bottom plan view of a portion of the same; Fig. 3, a side elevation; Fig. 4, a detail plan section on the line $x$ $x$ of Fig. 3; and Fig. 5, a sectional view on the line $y$ $y$ of Fig. 1, looking to the rear.

Like letters refer to like parts in all the figures of the drawings.

My invention relates to road-machines, and more particularly to machines for constructing ice-roads for hauling logs and like articles in winter time; and it consists in certain novel features, which I will now proceed to describe, and then specifically point out in the claims.

In the drawings, A represents a sled-body, which forms the frame of my improved road-machine, and which may be of any approved construction, being preferably constructed, however, in the manner shown in the drawings. It consists of two runners, $a$, connected by cross-pieces B, so constructed that these cross-pieces may be lengthened or shortened to vary the distance between the runners, and, consequently, the gage of the road. Each cross-piece consists of two similarly-constructed portions, B', halved onto each other for the central portion of their length, as shown in Figs. 1 and 4, each portion B' being provided with a metallic strip, $b$, secured to it at its outer end, and projecting over the cut-away portion in such a manner as to receive the corresponding part, B', between the said strip and the portion B' to which it is attached. The end of each part B' farthest from the runner to which it is attached is provided with a bolt, $b'$, rigidly mounted in the said end, and in the corresponding end of the corresponding strip, $b$, and passing through slots formed in the other part, B', and in the strip $b$, attached thereto. It will be seen from this construction that the parts B' and their corresponding strips may slide upon each other to vary the length of the cross-piece B, so as to increase or diminish the distance between the runners, the parts being locked in any desired position by tightening up the nuts on the bolts $b'$.

C indicates a draft-bar, to which the tongue C' is attached in any suitable manner, this draft-bar being pivoted between the forward ends of the runners $a$, the pivots being attached to slotted plates $c$, secured on the under side of the draft-bar C by means of bolts $c'$. It is obvious that when the sled-runners are separated to a greater or less extent by varying the length of the cross-pieces B, as hereinbefore described, the slotted plates $c$ will remain in the same relative position to their respective runners, sliding upon the draft-bar in an obvious manner, and being secured after adjustment by tightening up the nuts on the bolts $c'$. Brace-rods $C^2$ are attached to the runners and to the plates $c$ in order to give additional support to the said plates and to the draft-bar C. To each runner is attached a plow, D, and, since the construction of these plows is identical, I will only describe one of them, it being understood that the same description is equally applicable to the other. On the inner side of the runner is located a vertical knife, $d$, extending a slight distance below the lower edge of the runner, and immediately in the rear of this knife the runner is cut away, as shown at $d'$, to receive a cutter or share, D', and this cutter is attached to a suitable block or support, $d^2$, on the side of the runner, being preferably made adjustable to vary the depth of its cut by securing it by means of bolts passing through slots in the share, as shown.

$D^2$ indicates an extension plate or wing extending upward and outward from the share in the plane of its surface, and attached to and supported by block $d^2$ and a brace, $d^3$.

The operation of my device is as follows: It being desired to make an ice-road in the snow, the sled-frame A is adjusted, as hereinbefore described, to the desired width and drawn along the ground over which it is desired to make the road. The knives $d$ will form an opening cut in the snow, and the shares D', which follow them, will cut a groove of the width of the share, the snow being carried up over the extensions D² and thrown one side out of the way. In this manner two parallel grooves are formed in the snow at a distance apart equal to the distance between the runners of the sleds employed in hauling the logs or other material. These grooves are afterward filled with water by means of a suitably-constructed watering-car, or otherwise, which water subsequently freezes and forms a hard ice-road, upon which the sleds will travel easily. The snow which is thrown up at the sides of the grooves, when wet and subsequently frozen, forms hard icy sides or inclines at each side of the road, which will prevent the sleds from leaving the road. In ice-roads of the ordinary construction, where the water is merely sprinkled upon the surface of the snow, the road proper becomes higher than the level of the snow at the side of the road, and any unevenness or a low place in the road will cause the sled to slew or slide off the road, and it is then extremely difficult to place it on the road again. By reason of the inclines at the side of the road formed by my improved road-machine, as hereinbefore described, any tendency of the sled to leave the road is overcome, since these inclines will return the sled to the road-surface as soon as it comes in contact with them.

Although I have shown a preferred form of sled-frame in which the runners are adjustable to form different widths of track, still it is obvious that an ordinary sled-frame of any improved construction may be substituted. It is also obvious that various mechanical modifications in the details of construction may be made without departing from the principle of my invention. I therefore do not wish to be understood as limiting myself strictly to the precise details of construction hereinbefore described and shown in the drawings.

Having thus described my invention, what I claim as new, and desire to secure by Letters Patent, is—

1. The herein-described ice-road machine, consisting of a sled-frame provided with plows attached to the runners thereof, substantially as and for the purposes specified.

2. The combination, with the sled-runner, of a knife or plow placed therein and adjustable to be raised or lowered, and a wing to throw to one side the cuttings, substantially as and for the purposes specified.

3. The combination, with a sled-frame which is adjustable to vary the distance between the runners, of plows attached to the said runners, substantially as and for the purposes described.

4. The combination, with the sled-frame, of the knives $d$, shares or cutters D', and extension-plates D², substantially as and for the purposes described.

5. The combination, with the sled-frame having its runners cut away at $d'$, of the knives $d$, arranged on the inner side of the runners in advance of the said cut-away portions, the shares D', arranged in the said cut-away portions and projecting beyond the same outward, and the extension-plates D², substantially as and for the purposes described.

6. The combination, with runners $a$, of the cross-pieces B, consisting of the parts B', halved upon each other, as described, the strips $b$, and the bolts $b'$, passing through slots in one strip and part B', and attached to the other strip and part, substantially as and for the purposes described.

7. The combination, with the runners $a$ and extension cross-pieces B, of the draft-bar C and plates $c$, adjustably attached to the draft-bar and pivoted in the runners, substantially as and for the purposes described.

8. The combination, with the runners $a$ and extension cross-pieces B, of the draft-bar C, plates $c$, pivoted in the runners and adjustably attached to the draft-bar, and braces C², attached to the runners and to the plates $c$, substantially as and for the purposes described.

CASPER C. STEPHENSON.

Witnesses:
MATT PICKLE,
WILLIAM H. HARWOOD.